United States Patent
Zhang et al.

(10) Patent No.: US 12,273,162 B2
(45) Date of Patent: Apr. 8, 2025

(54) COEVOLUTION-BASED MULTI-BEAMFORMING OPTIMIZING METHOD FOR SPACE-BASED ADS-B

(71) Applicant: Beihang University, Beijing (CN)

(72) Inventors: Xuejun Zhang, Beijing (CN); Yuanhao Tan, Beijing (CN); Xueyuan Li, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/277,356

(22) PCT Filed: Jan. 17, 2023

(86) PCT No.: PCT/CN2023/072568
§ 371 (c)(1),
(2) Date: Aug. 15, 2023

(87) PCT Pub. No.: WO2024/103518
PCT Pub. Date: May 23, 2024

(65) Prior Publication Data
US 2025/0007571 A1    Jan. 2, 2025

(30) Foreign Application Priority Data
Nov. 18, 2022   (CN) .......................... 202211458715.2

(51) Int. Cl.
*H04L 5/12*         (2006.01)
*H04B 7/0426*       (2017.01)
(Continued)

(52) U.S. Cl.
CPC ........... *H04B 7/043* (2013.01); *H04B 7/0456* (2013.01); *H04B 7/1851* (2013.01)

(58) Field of Classification Search
CPC ....... H04L 7/0016; H04L 7/0037; G06F 1/04; G06F 1/08; G06F 1/206; H03K 3/017;
(Continued)

(56) References Cited

U.S. PATENT DOCUMENTS

| 10,491,286 B2 * | 11/2019 | Park ..................... H04B 7/0617 |
| 2017/0047977 A1 * | 2/2017 | Kim ..................... H04B 7/0621 |
| 2020/0274592 A1 * | 8/2020 | Mandula ............. H04L 25/0204 |

FOREIGN PATENT DOCUMENTS

| CN | 108418610 | 8/2018 |
| CN | 114389650 | 4/2022 |
| WO | 2020249604 | 12/2020 |

OTHER PUBLICATIONS

Zhang et al., "A Review of Development of Space-based ADS-B system and its key technologies" Journal of Beijing University of Aeronautics and Astronautics, vol. 48, No. 9, Sep. 30, 2022.
(Continued)

*Primary Examiner* — Helene E Tayong
(74) *Attorney, Agent, or Firm* — NZ Carr Law Office

(57) ABSTRACT

The present invention discloses a coevolution-based multi-beamforming optimizing method for space-based ADS-B, which belongs to the field of aviation technologies. According to this method, after initializing population and acquiring an initial optimal solution, optimization parameters are firstly grouped randomly so that all beams form several significant uncovered regions. Then, grouping is performed by an adaptive grouping strategy based on the relative orientation between the mean center of the largest uncovered region and the direction of each beam, so that the parameters quickly converge to a full-coverage state within the half angle of the satellite. Finally, grouping is performed by a grouping strategy based on the aircraft density covered by each beam to obtain optimally the minimal update time interval under a full-coverage constraint. The method of the
(Continued)

present invention adopts an adaptive dynamic grouping strategy based on the beam pointing, the orientation of uncovered region and the aircraft density covered by each beam, such that the algorithm performance and optimization efficiency can both be improved.

5 Claims, 1 Drawing Sheet

(51) Int. Cl.
  *H04B 7/0456* (2017.01)
  *H04B 7/185* (2006.01)
(58) Field of Classification Search
  CPC .......... H03K 3/037; H03K 5/14; H03K 19/20; H03K 2005/00078; H03K 2005/00071; H03K 2005/00234; H03K 5/133; H03K 5/1565; H03K 5/05; H03K 5/06; H03K 5/135; H03K 5/15013; G11C 7/22
  USPC ........................................................ 375/262
  See application file for complete search history.

(56) References Cited

OTHER PUBLICATIONS

Zhu, Xiaofeng et al. "Performance Analysis of ADS-B Receiving System Based on LEO Satellite Constellation" 2022 21 st International Symposium on Communications and Information Technologies (ISCIT), Sep. 30, 2022.
English translation of International Search Report for PCT/CN2023/072568 issued on Jul. 24, 2023.

* cited by examiner

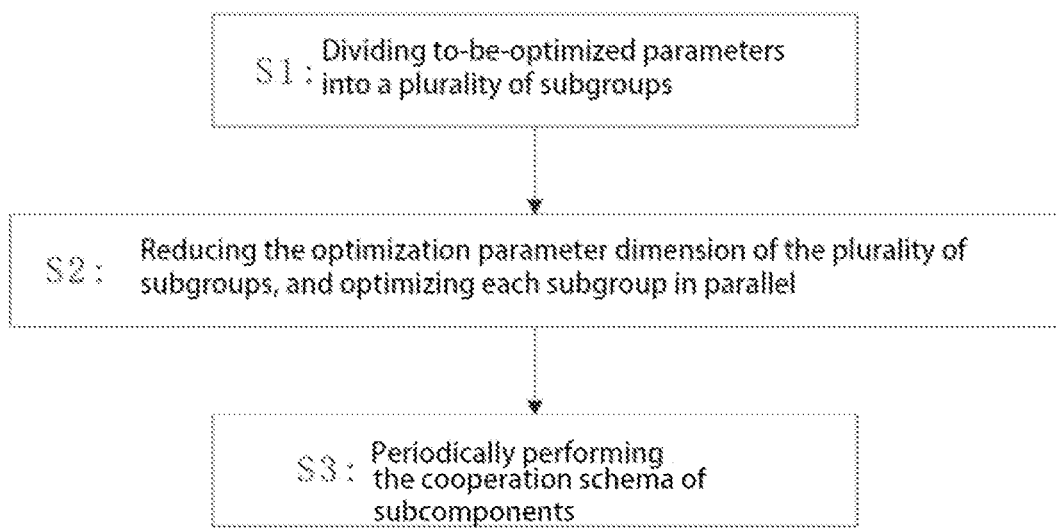

COEVOLUTION-BASED MULTI-BEAMFORMING OPTIMIZING METHOD FOR SPACE-BASED ADS-B

TECHNICAL FIELD

The present invention belongs to the field of aviation technologies, and in particular relates to a coevolution-based multi-beamforming optimizing method for space-based ADS-B.

BACKGROUND

The space-based ADS-B system has a rather wide coverage area, and a single payload needs to meet the simultaneous operation of more than a thousand aircraft. Thus, the great number of messages may cause signals to be severely overlapped or interleaved. In order to alleviate the problem of the space-based ADS-B system's surveillance performance degradation caused by co-channel interference, a feasible solution at present is to use phased array antennas and reduce the collision probability through the multi-beamforming method. For the optimization problem in digital multi-beamforming of the space-based ADS-B, the centralized bio-inspired approaches, such as genetic algorithm (GA) and particle swarm optimization (PSO) are adopted. However, due to the limitations of their optimization performance and large parameter scale, they can easily converge to a local optimum and cannot get a better result. A cooperative coevolution (CC) method has received more and more attention in recent years. In the CC framework, a key step is parameter grouping. An ideal parameter grouping strategy shall minimize the interdependence among parameters of respective subcomponents after grouping. In a currently proposed coevolution framework based on random grouping and 2-decomposition grouping, the random grouping cannot effectively solve the interdependencies among subcomponents, and the 2-decomposition grouping decomposes the n-dimensional parameter optimization problem into n/2 dimensions. When the parameter scale is large, the parameter scale of the subcomponent is still very large when using this grouping strategy. For the CC algorithms based on variance priority or the delta grouping strategy, if there are more than one non-separable group of variables, these two grouping strategies are less efficient.

SUMMARY

In view of this, an object of the present invention is to provide a distributed cooperative coevolution with an improved adaptive grouping strategy for the space-based ADS-B multi-beamforming optimization, which, compared with genetic algorithm and distributed coevolution algorithm based on other existing grouping strategies, has a faster convergence speed and can obtain a shorter update interval for position messages, and thereby can achieve a better optimization effect.

To achieve the object above, the present invention provides the technical solutions as follows.

The present invention provides a coevolution-based multi-beamforming optimizing method for space-based ADS-B, which comprises steps of:

S1: dividing to-be-optimized parameters into a plurality of subcomponents;

S2: reducing the optimization parameter dimension of the plurality of subcomponents, and optimizing each subcomponent in parallel; and S3: periodically performing the cooperation schema of subcomponents, wherein the step S1 specifically comprises steps of:

S1.1: initializing population and acquiring initial to-be-optimized parameters;

S1.2: randomly grouping the to-be-optimized parameters so that all beams form several significant uncovered regions;

S1.3: grouping the to-be-optimized parameters by an adaptive grouping strategy based on the relative orientation between the mean center of the largest uncovered region and the direction of each beam, so that the to-be-optimized parameters quickly converge to a full-coverage state within the half angle of the satellite; and S1.4: regrouping a result obtained in step S1.3 through a grouping strategy based on the aircraft density covered by each beam to optimally obtain the update interval under a full-coverage constraint.

Furthermore, in step S1.1, initializing population and acquiring initial to-be-optimized parameters specifically comprises:

enabling an antenna carried by an ADS-B satellite to be a rectangular uniform planar array, wherein a number of array elements is $N_E = N_1 \times N_2$, a weight matrix W for multi-beamforming reception of the space-based ADS-B is defined as:

$$W \triangleq [w_1, w_2, \ldots, w_{N_b}] = \begin{bmatrix} w_{1,1} & w_{1,2} & \cdots & w_{1,N_b} \\ w_{2,1} & w_{2,2} & \cdots & w_{2,N_b} \\ \vdots & \vdots & \ddots & \vdots \\ w_{N_E,1} & w_{N_E,2} & \cdots & w_{N_E,N_b} \end{bmatrix}, \quad (1)$$

and then the initial to-be-optimized parameter $\Omega$ may be expressed as:

$$\Omega = \begin{bmatrix} A_{1,1} & A_{1,2} & \cdots & A_{1,N_b} \\ \varphi_{1,1} & \varphi_{1,2} & \cdots & \varphi_{1,N_b} \\ \vdots & \vdots & \ddots & \vdots \\ A_{N_E,1} & A_{N_E,2} & \cdots & A_{N_E,N_b} \\ \varphi_{N_E,1} & \varphi_{N_E,2} & \cdots & \varphi_{N_E,N_b} \end{bmatrix}, \quad (3)$$

wherein $N_1$ and $N_2$ refer to the row and column of an array antenna, respectively; $N_b$ refers to a number of digital beamforming vectors; $W_{i,j}$ refers to a weight vector element of the $j^{th}$ array element of the $i^{th}$ beam; $A_{i,j}$ refers to an amplitude excitation of the $j^{th}$ array element of the $i^{th}$ beam, and and $A_{min} \leq A_{i,j} \leq A_{max}$; and $\varphi_{i,j}$ refers to a phase excitation of the $j^{th}$ array element of the $i^{th}$ beam, and $\varphi_{min} \leq \varphi_{i,j} \leq \varphi_{max}$.

Furthermore, in step S1.2, all beams form several significant uncovered regions according to a multi-beamforming optimization objective function;

wherein the multi-beamforming optimization objective function is:

$$J_{extend} = \min_{\Omega}(\Delta t_{95\%} + \delta \hat{g}_c(\Omega)), \quad (7)$$

wherein $\Delta t_{95\%}$ refers to the update interval of position messages at the update probability of 95%; $\delta$ takes a sufficiently large positive integer, which is a full-coverage penalty factor within a given half angle of the satellite; and $\delta \hat{g}_c(\Omega)$ refers to a full-coverage constraint formula within the given half angle of the satellite, and is expressed as:

$$\hat{g}_c(\Omega) = \sum_{i=1}^{359} \sum_{j=1}^{\lfloor el_0 \rfloor + 2} C_{i,j} = 0, \tag{6}$$

wherein $C_{i,j}$ refers to an element in the $i^{th}$ row and the $j^{th}$ column of a full-coverage matrix C, and $el_0$ refers to the half angle that the satellite needs to cover; when $N_b$ beams do not achieve full coverage within the given half angle, $J_{extend}$ will get a very great value, and when an optimization result satisfies the full-coverage constraint within the given half angle, a value of $\delta \hat{g}_c(\Omega)$ will be replaced with 0.

Furthermore, in step S1.3, a decision vector $\tilde{\varepsilon}$ for the adaptive grouping strategy based on the relative orientation between the mean center of the largest uncovered region and the direction of each beam is expressed as:

$$\tilde{\varepsilon} = \left[ \frac{1}{N_{pop}} \sum_{i=1}^{N_{pop}} \|D'_{i1} - \tilde{C}_{iq_{max}}\|, \right. \tag{17}$$

$$\left. \frac{1}{N_{pop}} \sum_{i=1}^{N_{pop}} \|D'_{i2} - \tilde{C}_{iq_{max}}\|, \ldots, \frac{1}{N_{pop}} \sum_{i=1}^{N_{pop}} \|D'_{iN_b} - \tilde{C}_{iq_{max}}\| \right]^T,$$

wherein $N_{pop}$ refers to a number of individuals in the optimized population, wherein $D'_{i,j}$ refers to the Earth surface position that the $j^{th}$ beam points to generated by the $i^{th}$ individual; $\tilde{C}_{iq_{max}}$ refers to the mean center of the largest uncovered region generated by the $i^{th}$ individual; and $N_b$ refers to the number of digital beamforming vectors;

the grouping strategy based on the relative orientation between the mean center of the largest uncovered region and the direction of each beam, may regroup the to-be-optimized parameter $\Omega$ as:

$$\Omega_{group_1} = \left[ \Omega_{subgroup_1}, \Omega_{subgroup_2}, \ldots, \Omega_{subgroup_{N_b-2}} \right], \tag{18}$$

wherein the $g_1^{th}$ subcomponent is written as:

$$\Omega_{subgroup_{g_1}} = [\Omega_M, \Omega_N, \Omega_{g_1}] \tag{19}$$

$$g_1 \ne M, g_1 \ne N, M \ne N$$

$$M \in [1, N_b], N \in [1, N_b], g_1 \in [1, N_b],$$

satisfying the following constraint:

$$\forall g_1 \in [1, N_b], \text{ s.t. } \tilde{\varepsilon}_M \ge \tilde{\varepsilon}_N \ge \tilde{\varepsilon}_{g_1}, \tag{20}$$

wherein $\tilde{\varepsilon}_M$, $\tilde{\varepsilon}_N$ and $\tilde{\varepsilon}_{g_1}$ refer to $M^{th}$, $N^{th}$ and $g_1^{th}$ elements in the decision vector $\tilde{\varepsilon}$, respectively.

Furthermore, in step S1.4, a decision vector $\tilde{\mu}$ for the grouping strategy based on the aircraft density covered by each beam is expressed as:

$$\tilde{\mu} = \left[ \frac{1}{N_{pop}} \sum_{i=1}^{N_{pop}} \rho_{i1}, \frac{1}{N_{pop}} \sum_{i=1}^{N_{pop}} \rho_{i2}, \ldots, \frac{1}{N_{pop}} \sum_{i=1}^{N_{pop}} \rho_{iN_b} \right]^T, \tag{23}$$

wherein $\rho_{ij}$ refers to the aircraft density in the region covered by the $j^{th}$ beam generated by the $i^{th}$ individual; and the grouping strategy based on the aircraft density covered by each beam may regroup the to-be-optimized parameter $\Omega$ as:

$$\Omega_{group_2} = \left[ \Omega_{subgroup'_1}, \Omega_{subgroup'_2}, \ldots, \Omega_{subgroup'_{N_b-2}} \right], \tag{24}$$

wherein the $g_2^{th}$ subgroup is written as:

$$\Omega_{subgroup_{g_2}} = [\Omega_M, \Omega_N, \Omega_{g_2}] \tag{25}$$

$$g_2 \ne M, g_2 \ne N, M \ne N$$

$$M \in [1, N_b], N \in [1, N_b], g_2 \in [1, N_b]$$

satisfying the following constraint:

$$\forall g_2 \in [1, N_b], \text{ s.t. } \tilde{\mu}_M \ge \tilde{\mu}_N \ge \tilde{\mu}_{g_2}, \tag{26}$$

wherein $\tilde{\mu}_M$, $\tilde{\mu}_N$ and $\tilde{\mu}_{g_2}$ refer to $M^{th}$, $N^{th}$ and $g_2^{th}$ elements in the decision vector $\tilde{\mu}$, respectively.

Furthermore, the cooperation schema of subcomponents used in step S3 comprises:

S3.1: combining an intermediate result obtained after parallel optimization of a subcomponent in step S2 with other original subcomponents to obtain a to-be-decided parameter vector, and then calculating a corresponding fitness value by substituting the to-be-decided parameter vector into an objective function; and S3.2: taking out a parameter vector with the smallest fitness value among fitness values corresponding to all subcomponents as the optimal solution calculated from this iterative cycle and at the same time as an original to-be-optimized parameter vector for a next iterative cycle.

The present invention has following advantageous effects.

The present invention proposes a distributed coevolution algorithm based on an improved adaptive grouping strategy to optimally handle the optimization problem in digital multi-beamforming of the space-based ADS-B. Thus, the present invention, compared with genetic algorithm and distributed coevolution algorithm based on other existing grouping strategies, has a faster convergence speed and can obtain a shorter update interval for position messages, and thereby can achieve a better optimization effect.

Other advantages, objects and features of the present invention will be further explained in the following description, and to some extent will be obvious to those skilled in the art, or those skilled in the art can be taught by the practice of the present invention. The objects and other advantages of the present invention may be achieved and acquired through the following description.

DETAILED DESCRIPTION

The present invention provides a coevolution-based multi-beamforming optimizing method for space-based ADS-B, which comprises steps of:

S1: dividing to-be-optimized parameters into a plurality of subcomponents;

S2: reducing the optimization parameter dimension of the plurality of subcomponents, and optimizing each subcomponent in parallel; and S3: periodically performing the cooperation schema of subcomponents, wherein the step S1 specifically comprises steps of:

S1.1: initializing population and acquiring initial to-be-optimized parameters;

S1.2: randomly grouping the to-be-optimized parameters so that all beams form several significant uncovered regions;

S1.3: grouping the to-be-optimized parameters by an adaptive grouping strategy based on the relative orientation between the mean center of the largest uncovered region and the direction of each beam, so that the to-be-optimized parameters quickly converge to a full-coverage state within the half angle of the satellite; and S1.4: regrouping a result obtained in step S1.3 through a grouping strategy based on the aircraft density covered by each beam to optimally obtain the update interval under a full-coverage constraint.

The specific optimization steps adopted in the aforesaid optimization method will be described in detail below.

It is assumed that an antenna carried by the ADS-B satellite is a rectangular uniform planar array, where the number of array elements is $N_E = N_1 \times N_2$ and $N_1$ and $N_2$ are the column and row of the array antenna. A weight matrix W is designed for multi-beamforming reception of the space-based ADS-B, which includes $N_b$ digital beamforming vectors and is defined as:

$$W \triangleq [w_1, w_2, \ldots, w_{N_b}] = \begin{bmatrix} w_{1,1} & w_{1,2} & \cdots & w_{1,N_b} \\ w_{2,1} & w_{2,2} & \cdots & w_{2,N_b} \\ \vdots & \vdots & \ddots & \vdots \\ w_{N_E,1} & w_{N_E,2} & \cdots & w_{N_E,N_b} \end{bmatrix}. \quad (1)$$

For the weight vector element $W_{j,i}$ of the $j^{th}$ array element of the $i^{th}$ beam, it may be expressed as $A_{j,i} e^{j\varphi_{j,i}}$ with the form of amplitude and phase, where $A_{j,i}$ is the amplitude excitation of the $j^{th}$ array element of the $i^{th}$ beam, and $A_{min} \leq A_{j,i} \leq A_{max}$ and $\varphi_{j,i}$ is the phase excitation of the $j^{th}$ array element of the $i^{th}$ beam, and $\varphi_{min} \leq \varphi_{j,i} \leq \varphi_{max}$ both of which are variable parameters that need to be optimized. Thus, W may be rewritten as:

$$W = \begin{bmatrix} A_{1,1} e^{j\varphi_{1,1}} & A_{1,2} e^{j\varphi_{1,2}} & \cdots & A_{1,N_b} e^{j\varphi_{1,N_b}} \\ A_{2,1} e^{j\varphi_{2,1}} & A_{2,2} e^{j\varphi_{2,2}} & \cdots & A_{2,N_b} e^{j\varphi_{2,N_b}} \\ \vdots & \vdots & \ddots & \vdots \\ A_{N_E,1} e^{j\varphi_{N_E,1}} & A_{N_E,2} e^{j\varphi_{N_E,2}} & \cdots & A_{N_E,N_b} e^{j\varphi_{N_E,N_b}} \end{bmatrix}. \quad (2)$$

Therefore, the to-be-optimized parameter of digital multi-beamforming problem for the space-based ADS-B may be expressed as a $2N_E \times N_b$ dimensional vector as follows:

$$\Omega = \begin{bmatrix} A_{1,1} & A_{1,2} & \cdots & A_{1,N_b} \\ \varphi_{2,1} & \varphi_{2,2} & \cdots & \varphi_{2,N_b} \\ \vdots & \vdots & \ddots & \vdots \\ A_{N_E,1} & A_{N_E,2} & \cdots & A_{N_E,N_b} \\ \varphi_{N_E,1} & \varphi_{N_E,2} & \cdots & \varphi_{N_E,N_b} \end{bmatrix}. \quad (3)$$

For any point C on the earth's surface within the half angle of the satellite, assuming that an elevation angle of the radio wave incident to the ADS-B antenna array at this point is el, and an azimuth angle incident to the ADS-B antenna array is az, the single-point coverage function is defined as:

$$c(az, el) = \begin{cases} 0, & \text{if } \exists i \in [1, N_b], P_{d,i}(az, el) \geq 90\% \\ 1, & \text{if } \forall i \in [1, N_b], P_{d,i}(az, el) < 90\% \end{cases}, \quad (4)$$

where $P_{d,i}(az,el)$ refers to the probability that the ADS-B signal broadcast by an aircraft equipped with an A1-level ADS-B Out transmitter at the point C is correctly decoded by the $i^{th}$ beam under the condition of no co-channel interference. Assuming that the half angle that the satellite needs to cover is $el_0$, the $360 \times (\lfloor el_0 \rfloor + 1)$ dimensional coverage matrix is defined as:

$$C = \begin{bmatrix} c(-180, -90), & c(-180, -89), \ldots, c(-180, \lfloor el_0 \rfloor - 90), & c(-180, el_0 - 90) \\ & \ddots & \\ & c(az, el) & \\ & & \ddots \\ c(179, -90), & c(179, -89), \ldots, c(179, \lfloor el_0 \rfloor - 90), & c(179, el_0 - 90) \end{bmatrix}. \quad (5)$$

If the range of the half angle $el_0$ required by the metrics is fully covered by the satellite, the value of each element in C is 0; and if an orientation in the range of the half angle $el_0$ is not covered, the value of the element in C corresponding to the orientation is 1. Thus, the full-coverage constraint formula within the given half angle of the satellite may be defined as:

$$\hat{g}_c(\Omega) = \sum_{i=1}^{359} \sum_{j=1}^{\lfloor el_0 \rfloor + 2} C_{i,j} = 0, \quad (6)$$

where $C_{i,j}$ refers to an element in the $i^{th}$ row and the $j^{th}$ column of the full-coverage matrix C, and the final digital multi-beamforming optimization objective function for the space-based ADS-B may be expressed as:

$$J_{extend} = \min_{\Omega} (\Delta t_{95\%} + \delta \hat{g}_c(\Omega)), \quad (7)$$

where $\delta$ takes a sufficiently large positive integer, which is a full-coverage penalty factor within the given half angle of the satellite. When $N_b$ beams do not achieve a full coverage within the given half angle, $J_{extend}$ will get a very large value. On the contrary, the value of $\delta \hat{g}_c(\Omega)$ may be replaced with 0 when the optimization result satisfies the full-coverage constraint within the given half angle.

1) Grouping Strategy Based on the Relative Orientation Between the Mean Center of the Largest Uncovered Region and the Direction of Each Beam This part mainly improves the efficiency in achieving full coverage of the satellite. The $2N_E \times N_b$ dimensional to-be-optimized parameters $\Omega$ defined by formula (3) may be written as:

$$\Omega = [\Omega_1, \Omega_2, \ldots, \Omega_i, \Omega_{i+1}, \ldots, \Omega_{N_b-1}, \Omega_{N_b}], \quad (8)$$

where $\Omega_i = [A_{1,i}, \varphi_{1,i}, A_{2,i}, \varphi_{2,i}, \ldots A_{N_E,i}, \varphi_{N_E,i}]^T$ refers to parameters of the amplitude and phase excitation of each array element corresponding to the $i^{th}$ beam. When all the beams form several uncovered regions during the optimization process, optimizing the beam closest to the center point of the largest uncovered region as much as possible can effectively accelerate the progress of achieving the full coverage.

The full-coverage matrix C is a binary matrix, where if the orientation represented by each element is covered, the element has a value of 0, otherwise a value of 1. Assuming there are m uncovered regions, there will be m 8-connected regions in the full-coverage matrix C, which may be expressed as $\Lambda = [\Lambda_1, \Lambda_2, \ldots, \Lambda_m]$, where one 8-connected region $\Lambda_q$ may be written as:

$$\Lambda_q = \left[ 1_{el_1,az_1}, 1_{el_2,az_2}, \ldots, 1_{el_{u_q},az_{u_q}} \right]^T, \quad q \in [1, m], \quad (9)$$

indicating that the region includes $u_q$ uncovered orientations. For a determined uncovered point $U_k = [el_k, az_k]$, $el_k$ and $az_k$ refer to the elevation angle and azimuth angle of the point relative to the antenna array, respectively, and the relative position vector from the earth's core O to the uncovered point $U_k$ is $P_{U_k} = [x_{U_k}, y_{U_k}, z_{U_k}]^T$. The relative position vector from the earth's core O to a sub-satellite point Sub is represented as $P_{Sub} = [x_{Sub}, y_{Sub}, z_{Sub}]^T$. Assuming that the longitude and latitude of the current sub-satellite point are $L_{Sub}$ and $B_{Sub}$, respectively, the coordinates of the sub-satellite point may be expressed as:

$$\begin{cases} x_{Sub} = N_{Sub} \cos L_{Sub} \cos B_{Sub} \\ y_{Sub} = N_{Sub} \sin L_{Sub} \cos B_{Sub} \\ z_{Sub} = N_{Sub}(1-e^2) \sin B_{Sub} \end{cases} \quad (10)$$

where $$N_{Sub} = \frac{a}{\sqrt{1-e^2 \sin^2 B_{Sub}}};$$

a vector $P_{R_1}$ may be obtained by rotating the vector $P_{Sub}$ along a normal unit vector $$\hat{r}_1 = \frac{r_1}{\|r_1\|}$$

of an orbital plane SRO by an angle $el_k$. $P_{U_k}$ may be regarded as obtained by rotating the vector $P_{R_1}$ along the unit vector $$\hat{r}_3 = \frac{ps}{\|ps\|}$$

from the earth's core to the satellite by the angle $az_k$. Thus, $P_{u_k} = [x_{U_k}, y_{U_k}, z_{U_k}]^T$ can be obtained by the following formula:

$$p_{R_1} = p_{Sub}\cos el_k - p_{Sub} \times \hat{r}_1 \sin el_k + (p_{Sub}^T \hat{r}_1)\hat{r}_1(1-\cos el_k) \quad (11)$$

$$p_{U_k} = p_{R_1}\cos az_k - p_{R_1} \times \hat{r}_3 \sin az_k + (p_{R_1}^T \hat{r}_3)\hat{r}_3(1-\cos az_k).$$

Based on this, the latitude and longitude coordinates of the uncovered point $U_k$ may be calculated as follows:

$$\begin{cases} L_{U_k} = \arctan \frac{y_{U_k}}{x_{U_k}} \\ B_{U_k} = \arctan \left[ \frac{z_{U_k}}{\sqrt{x_{U_k}^2 + y_{U_k}^2}} (1-e^2)^{-1} \right] \end{cases} \quad (12)$$

Assuming that $\Lambda_{q_{max}}$ is the one with the most uncovered orientations among the m uncovered regions, then there is the following formula:

$$u_{q_{max}} \geq u_q, \forall\, q_{max} \in [1, m], q \in [1, m], q \neq q_{max}. \quad (13)$$

The mean center of the uncovered region $\Lambda_{q_{max}}$ is denoted as $\tilde{C}_{q_{max}} = [L_{\tilde{C}_{q_{max}}}, B_{\tilde{C}_{q_{max}}}]^T$, and the longitude $L_{\tilde{C}_{q_{max}}}$ and latitude $B_{\tilde{C}_{q_{max}}}$ thereof may be expressed as:

$$\begin{cases} L_{\tilde{C}_{q_{max}}} = \frac{1}{u_{q_{max}}} \sum_{k=1}^{u_{q_{max}}} L_{U_k} \\ B_{\tilde{C}_{q_{max}}} = \frac{1}{u_{q_{max}}} \sum_{k=1}^{u_{q_{max}}} B_{U_k} \end{cases} \quad (14)$$

The directions to which $N_b$ digital beams generated by the parameters $\Omega$ point is denoted as $D = [D_1, D_2, \ldots, D_{N_b}]$, where $D_i = [el_i, az_i]^T$, $el_i$ and $az_i$ refer to the elevation angle and azimuth angle of the $i^{th}$ beam relative to the antenna array, respectively. Thus, the latitude and longitude of the position where the $N_b$ digital beams point to the earth surface may be derived with reference to formulas (12), (13) and (14), denoted as $D' = [D'_1, D'_2, \ldots, D'_{N_b}]$, where $D'_i = [L_i, B_i]^T$. Therefore, the reference vector $\varepsilon$ of the grouping strategy based on the relative orientation between the mean center of the largest uncovered region and the direction of each beam may be defined as:

$$\varepsilon = [\varepsilon_1, \varepsilon_2, \ldots, \varepsilon_{N_{pop}}], \quad (15)$$

where $N_{pop}$ refers to the number of individuals in the optimized population, and $\varepsilon_i$ refers to the grouping reference vector component generated by the $i^{th}$ individual in the population, which is written as:

$$\varepsilon_i = [\|D'_{i1} - \tilde{C}_{iq_{max}}\|, \|D'_{i2} - \tilde{C}_{iq_{max}}\|, \ldots, \|D'_{iN_b} - \tilde{C}_{iq_{max}}\|]^T, \quad (16)$$
$$i \in [1, N_{pop}],$$

where $D'_{ij}$ refers to the position where the $j^{th}$ beam generated by the $i^{th}$ individual points to the earth's surface; $\tilde{C}_{iq_{max}}$ refers to the mean center of the largest uncovered region under all beams generated by the $i^{th}$ individual. Thus, the decision vector $\tilde{\varepsilon}$ of the grouping strategy based on the relative orientation between the mean center of the largest uncovered region and the direction of each beam may be expressed as:

$$\tilde{\varepsilon} = \left[ \frac{1}{N_{pop}} \sum_{i=1}^{N_{pop}} \|D'_{i1} - \tilde{C}_{iq_{max}}\|, \frac{1}{N_{pop}} \sum_{i=1}^{N_{pop}} \|D'_{i2} - \tilde{C}_{iq_{max}}\|, \ldots, \frac{1}{N_{pop}} \sum_{i=1}^{N_{pop}} \|D'_{iN_b} - \tilde{C}_{iq_{max}}\| \right]^T. \quad (17)$$

The grouping strategy based on the relative orientation between the mean center of the largest uncovered region and the direction of each beam may regroup the to-be-optimized parameter $\Omega$ as:

$$\Omega_{group_1} = [\Omega_{subgroup_1}, \Omega_{subgroup_2}, \ldots, \Omega_{subgroup_{N_b-2}}], \quad (18)$$

where the $g_1^{th}$ subcomponent may be written as:

$$\Omega_{subgroup_{g_1}} = [\Omega_M, \Omega_N, \Omega_{g_1}] \quad (19)$$
$$g_1 \neq M, g_1 \neq N, M \neq N$$
$$M \in [1, N_b], N \in [1, N_b], g_1 \in [1, N_b],$$

satisfying a following constraint:

$$\forall g_1 \in [1, N_b], \text{ s.t. } \tilde{\varepsilon}_M \geq \tilde{\varepsilon}_N \geq \tilde{\varepsilon}_{g_1}, \quad (20)$$

where $\tilde{\varepsilon}_m, \tilde{\varepsilon}_N$ and $\tilde{\varepsilon}_{g_1}$ refer to $M^{th} N^{th}$ and $g_1^{th}$ elements in the decision vector $\tilde{\varepsilon}$, respectively.

2) Grouping Strategy Based on the Aircraft Density Covered by Each Beam

This part mainly improves the efficiency in minimizing the update interval. The reference vector $\mu$ of the grouping strategy based on the aircraft density covered by each beam may be defined as:

$$\mu = [\mu_1, \mu_2, \ldots, \mu_{N_{pop}}], \quad (21)$$

where $N_{pop}$ refers to the number of individuals in the optimized population, and $\mu_i$ refers to the grouping reference vector component generated by the $i^{th}$ individual in the population, which is written as:

$$\mu_i = [\rho_{i1}, \rho_{i2}, \ldots, \rho_{iN_b}]^T, i \in [1, N_{pop}], \quad (22)$$

where $\rho_{ij}$ refers to the aircraft density in the region covered by the $j^{th}$ beam generated by the $i^{th}$ individual. Thus, the decision vector $\tilde{\mu}$ of the grouping strategy based on the aircraft density covered by each beam may be expressed as:

$$\tilde{\mu} = \left[ \frac{1}{N_{pop}} \sum_{i=1}^{N_{pop}} \rho_{i1}, \frac{1}{N_{pop}} \sum_{i=1}^{N_{pop}} \rho_{i2}, \ldots, \frac{1}{N_{pop}} \sum_{i=1}^{N_{pop}} \rho_{iN_b} \right]^T. \quad (23)$$

The grouping strategy based on the aircraft density covered by each beam may regroup the to-be-optimized parameter $\Omega$ as:

$$\Omega_{group_2} = [\Omega_{subgroup'_1}, \Omega_{subgroup'_2}, \ldots, \Omega_{subgroup'_{N_b-2}}], \quad (24)$$

wherein the $g_2^{th}$ subcomponent is written as:

$$\Omega_{subgroup_{g_2}} = [\Omega_M, \Omega_N, \Omega_{g_2}] \quad (25)$$
$$g_2 \neq M, g_2 \neq N, M \neq N$$
$$P \in [1, N_b], N \in [1, N_b], g_2 \in [1, N_b]$$

satisfying a following constraint:

$$\forall g_2 \in [1, N_b], \text{ s.t. } \tilde{\mu}_M \geq \tilde{\mu}_N \geq \tilde{\mu}_{g_2}, \quad (26)$$

wherein $\tilde{\mu}_M, \tilde{\mu}_N$ and $\tilde{\mu}_{g_2}$ refer to $M^{th}, N^{th}$ and $g_2^{th}$ elements in the decision vector $\tilde{\mu}$, respectively.

When Subcomponent optimization is performed on subcomponents generated by variable grouping, each subcomponent will produce an optimized intermediate result. Afterwards, by sharing information on the intermediate results obtained by each subcomponent optimization, they are combined to make a collaborative decision, that is, the cooperation schema of subcomponents.

The collaborative decision among the optimization results of each subcomponent is reflected in the process of calculating and solving the fitness objective function. Assuming that the original entire to-be-optimized parameter vector $\Omega$ is decomposed into $N_b-2$ subcomponents, denoted as $\Omega_{group}=[\Omega_{subgroup_1}, \Omega_{subgroup_2}, \ldots \Omega_{subgroup_{N_b-2}}]$, through the variable grouping operation, the original parameter vector is brought into the objective function to acquire a fitness value J; then, the subcomponent optimization is performed for each subcomponent to acquire an intermediate result of subcomponent optimization. For example, the subcomponent optimization may be performed on the $g^{th}$ subcomponent $\Omega_{subgroup_g}$, and an intermediate result $\Omega^*_{subgroup_g}$, of the subcomponent optimization may be acquired; then, the intermediate result is combined with the original subcomponents other than this subcomponent, such that a new to-be-optimized parameter vector $\Omega_{group}=[\Omega_{subgroup_1}, \Omega_{subgroup_2}, \ldots \Omega^*_{subgroup_g}, \ldots, \Omega_{subgroup_{N_b-2}}]$ may be acquired; afterwards, the new to-be-optimized parameter vector, which is acquired by the cooperation schema of subcomponents after subcomponent optimization of the corresponding $g^{th}$ subcomponent $\Omega_{subgroup_g}$, may be brought into the objective function to acquire a corresponding fitness value $J^*_g$. Thus, $N_b-2$ to-be-optimized parameter vectors can be acquired by performing the cooperation schema of subcomponents following $N_b-2$ subcomponent optimizations; then, the $N_b-2$ to-be-optimized parameter vectors are brought into the objective function to acquire the corresponding fitness value. Afterwards, a parameter vector with the smallest fitness value is taken as an optimal solution calculated from the current iterative loop, and also serves as an original to-be-optimized parameter vector for a next iterative loop.

It shall be noted at last that the preferred embodiments are employed only to illustrate, instead of limiting, the technical solution of the present invention. Although the present invention has been described in detail by the preferred embodiments, it should be understood by those skilled in the art that various changes can be made in the form and details without departing from the scope defined by Claims of the present invention.

What is claimed is:

1. A coevolution-based multi-beamforming optimizing method for space-based Automatic Dependent Surveillance-Broadcast (ADS-B) system to broadcast multi-beamforming signals, comprising steps of:
   S1: dividing optimization parameters into a plurality of subcomponents;
   S2: reducing the optimization parameters dimension of the plurality of subcomponents, and optimizing each subcomponent in parallel to improve signal coverage of a satellite and reduce interference of aircraft signals across a full coverage region within a half-angle of the satellite; and
   S3: periodically performing a cooperation schema of subcomponents to reduce update intervals for aircraft position messages under a full-coverage constraint within the half angle of the satellite,
   wherein the cooperation schema of subcomponents in step S3 comprises:
   S3.1: combining an intermediate result obtained after parallel optimization of a subcomponent in step S2 with other original subcomponents to obtain a to-be-decided parameter vector, and then calculating a corresponding fitness value by substituting the to-be-decided parameter vector into an objective function; and
   S3.2: taking out a parameter vector with the smallest fitness value among fitness values corresponding to all subcomponents as the optimal solution calculated from this iterative cycle and at the same time as an original to-be-optimized parameter vector for a next iterative cycle,
   wherein the step S1 specifically comprises steps of:
   S1.1: initializing population, and acquiring initial to-be-optimized parameters;
   S1.2: randomly grouping the to-be-optimized parameters so that all beams form several significant uncovered regions;
   S1.3: grouping the to-be-optimized parameters by an adaptive grouping strategy based on the relative orientation between a mean center of a largest uncovered region and a direction of each beam, so that the to-be-optimized parameters quickly converge to a full-coverage state within the half angle of the satellite; and
   S1.4: regrouping a result obtained in step S1.3 by a grouping strategy based on an aircraft density covered by each beam to optimally obtain an update interval under the full-coverage constraint.

2. The coevolution-based multi-beamforming optimizing method for the space-based ADS-B according to claim 1, wherein in S1.1, initializing population and acquiring initial to-be-optimized parameter specifically comprises: enabling an antenna carried by an ADS-B satellite be a rectangular uniform planar array, wherein a number of array elements is $N_E=N_1 \times N_2$, and a weight matrix W for multi-beamforming reception of the space-based ADS-B is defined as:

$$W \triangleq [w_1, w_2, \ldots, w_{N_b}] = \begin{bmatrix} w_{1,1} & w_{1,2} & \cdots & w_{1,N_b} \\ w_{2,1} & w_{2,2} & \cdots & w_{2,N_b} \\ \vdots & \vdots & \ddots & \vdots \\ w_{N_E,1} & w_{N_E,2} & \cdots & w_{N_E,N_b} \end{bmatrix}, \quad (1)$$

and the initial to-be-optimized parameter $\Omega$ is then expressed as:

$$\Omega = \begin{bmatrix} A_{1,1} & A_{1,2} & \cdots & A_{1,N_b} \\ \varphi_{2,1} & \varphi_{2,2} & \cdots & \varphi_{2,N_b} \\ \vdots & \vdots & \ddots & \vdots \\ A_{N_E,1} & A_{N_E,2} & \cdots & A_{N_E,N_b} \\ \varphi_{N_E,1} & \varphi_{N_E,2} & \cdots & \varphi_{N_E,N_b} \end{bmatrix} \quad (3)$$

wherein $N_1$ and $N_2$ refer to row and column of an array antenna, respectively; $N_b$ refers to a number of digital beamforming vectors; $W_{j,i}$ refers to a weight vector element of the $j^{th}$ array element of the $i^{th}$ beam; $A_{j,i}$ refers to an amplitude excitation of the $j^{th}$ array element of the $i^{th}$ beam, and $A_{min} \leq A_{j,i} \leq A_{max}$ and $\varphi_{j,i}$ refers to a phase excitation of the $j^{th}$ array element of the $i^{th}$ beam, and $\varphi_{Pmin} \leq \varphi_{j,i} \leq \varphi_{max}$.

3. The coevolution-based multi-beamforming optimizing method for the space-based ADS-B according to claim 2, wherein in step S1.2, all beams form several significant uncovered regions according to a multi-beamforming optimization objective function;
   wherein the multi-beamforming optimization objective function is:

$$J_{extend} = \min_{\Omega} (\Delta t_{95\%} + \delta \hat{g}_c(\Omega)), \quad (7)$$

wherein $\Delta t_{95\%}$ refers to the update interval of position messages at the update probability of 95%; $\delta$ takes a sufficiently large positive integer which is a full-coverage penalty factor within a given half angle of the satellite; and $\delta \hat{g}_c(\Omega)$ refers to a full-coverage constraint formula within the given half angle of the satellite, and is expressed as:

$$\hat{g}_c(\Omega) = \sum_{i=1}^{359} \sum_{j=1}^{\lfloor el_0 \rfloor + 2} C_{i,j} = 0, \quad (6)$$

wherein $C_{i,j}$ refers to an element in the $i^{th}$ row and the $j^{th}$ column of a full-coverage matrix C; and $el_0$ refers to the half angle that the satellite needs to cover; when $N_b$ beams do not achieve full coverage within the given half angle, $J_{extend}$ will get a very great value, and when an optimization result satisfies the full-coverage constraint within the given half angle, a value of $\delta \hat{g}_c(\Omega)$ will be replaced with 0.

4. The coevolution-based multi-beamforming optimizing method for the space-based ADS-B according to claim 1, wherein in step S1.3, a decision vector $\bar{\varepsilon}$ for the adaptive grouping strategy based on relative orientation between the mean center of the largest uncovered region and the direction of each beam is expressed as:

$$\tilde{\varepsilon} = \left[ \frac{1}{N_{pop}} \sum_{i=1}^{N_{pop}} \|D'_{i1} - \tilde{C}_{iq_{max}}\|, \frac{1}{N_{pop}} \sum_{i=1}^{N_{pop}} \|D'_{i2} - \tilde{C}_{iq_{max}}\|, \ldots, \frac{1}{N_{pop}} \sum_{i=1}^{N_{pop}} \|D'_{iN_b} - \tilde{C}_{iq_{max}}\| \right]^T, \quad (17)$$

wherein $N_{pop}$, refers to a number of individuals in the optimized population, wherein $D'_{ij}$ refers to the Earth surface position that the $j^{th}$ beam points to generated by the $i^{th}$ individual; $\tilde{C}_{iq_{max}}$ refers to the mean center of the largest uncovered region generated by the $i^{th}$ individual; and $N_b$ refers to the number of digital beamforming vectors;

the grouping strategy based on the relative orientation between the mean center of the largest uncovered region and the direction of each beam, regroups the to-be-optimized parameter $\Omega$ as:

$$\Omega_{group_1} = \left[ \Omega_{subgroup_1}, \Omega_{subgroup_2}, \ldots, \Omega_{subgroup_{N_b-2}} \right], \quad (18)$$

wherein the $g_1{}^{th}$ subcomponent is written as:

$$\Omega_{subgroup_{g_1}} = [\Omega_M, \Omega_N, \Omega_{g_1}] \quad (19)$$
$$g_1 \neq M, g_1 \neq N, M \neq N$$
$$M \in [1, N_b], N \in [1, N_b], g_1 \in [1, N_b]$$

satisfying the following constraint:

$$\forall g_1 \in [1, N_b], \text{ s.t. } \tilde{\varepsilon}_M \geq \tilde{\varepsilon}_N \geq \tilde{\varepsilon}_{g_1}, \quad (20)$$

wherein $\tilde{\varepsilon}_M$, $\tilde{\varepsilon}_N$ and $\tilde{\varepsilon}_{g_1}$ refer to $M^{th}$, $N^{th}$ and $g_1{}^{th}$ elements in the decision vector $\tilde{\varepsilon}$, respectively.

5. The coevolution-based multi-beamforming optimizing method for the space-based ADS-B according to claim 1, wherein in step S1.4, a decision vector $\tilde{\mu}$ for the grouping strategy based on the aircraft density covered by each beam is expressed as:

$$\tilde{\mu} = \left[ \frac{1}{N_{pop}} \sum_{i=1}^{N_{pop}} \rho_{i1}, \frac{1}{N_{pop}} \sum_{i=1}^{N_{pop}} \rho_{i2}, \ldots, \frac{1}{N_{pop}} \sum_{i=1}^{N_{pop}} \rho_{iN_b} \right]^T, \quad (23)$$

wherein $P_{ij}$ refers to the aircraft density in the region covered by the $j^{th}$ beam generated by the $i^{th}$ individual; and the grouping strategy based on the aircraft density covered by each beam, regroups the to-be-optimized parameter $\Omega$ as:

$$\Omega_{group_2} = \left[ \Omega_{subgroup'_1}, \Omega_{subgroup'_2}, \ldots, \Omega_{subgroup'_{N_b-2}} \right], \quad (24)$$

wherein the $g_2{}^{th}$ subcomponent is written as:

$$\Omega_{subgroup_{g_2}} = [\Omega_M, \Omega_N, \Omega_{g_2}] \quad (25)$$
$$g_2 \neq M, g_2 \neq N, M \neq N$$
$$M \in [1, N_b], N \in [1, N_b], g_2 \in [1, N_b]$$

satisfying the following constraint:

$$\forall g_2 \in [1, N_b], \text{ s.t. } \tilde{\mu}_M \geq \tilde{\mu}_N \geq \tilde{\mu}_{g_2}, \quad (26)$$

wherein $\tilde{\mu}_M$, $\tilde{\mu}_N$ and $\tilde{\mu}_{g_2}$ refer to $M^{th}$, $N^{th}$ and $g_2{}^{th}$ elements in the decision vector, $\tilde{\mu}$, respectively.

\* \* \* \* \*